United States Patent
Moore et al.

(10) Patent No.: US 8,520,592 B2
(45) Date of Patent: Aug. 27, 2013

(54) INTEGRATED WIRELESS AND WIRELINE NETWORKS

(75) Inventors: Allen O. Moore, Florence, AL (US); Mehul D Gandhi, Framingham, MA (US); Christopher R Moore, Roanoke, TX (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 377 days.

(21) Appl. No.: 12/641,917

(22) Filed: Dec. 18, 2009

(65) Prior Publication Data

US 2011/0149841 A1  Jun. 23, 2011

(51) Int. Cl.
| H04W 4/00 | (2009.01) |
| H04L 12/66 | (2006.01) |
| H04M 1/00 | (2006.01) |
| H04B 1/38 | (2006.01) |

(52) U.S. Cl.
USPC ......... 370/328; 370/352; 455/550.1; 455/560

(58) Field of Classification Search
None
See application file for complete search history.

(56) References Cited

U.S. PATENT DOCUMENTS

| 6,459,908 | B1 * | 10/2002 | Cook et al. | 455/560 |
| 6,539,237 | B1 * | 3/2003 | Sayers et al. | 455/555 |
| 7,307,966 | B2 * | 12/2007 | Hussain | 370/310.1 |
| 2005/0026646 | A1 * | 2/2005 | Naim et al. | 455/552.1 |
| 2005/0232189 | A1 * | 10/2005 | Loushine | 370/328 |
| 2006/0087991 | A1 * | 4/2006 | Christie | 370/310 |
| 2006/0291435 | A1 * | 12/2006 | Hirsimaki et al. | 370/338 |
| 2007/0183402 | A1 * | 8/2007 | Bennett et al. | 370/352 |
| 2011/0116473 | A1 * | 5/2011 | Shaheen et al. | 370/331 |

* cited by examiner

*Primary Examiner* — Chirag Shah
*Assistant Examiner* — Srinivasa Reddivalam

(57) ABSTRACT

A method may include receiving, from an egress switch in a first wireless network, a request for instructions for routing a call from a calling party to a called party in a wireline network. In addition, the method may include performing a lookup to identify a service provider of the called party in a database. Still, in addition, the method may include generating an instruction indicating that the egress switch is to route the call to a core network connected to the egress switch via a direct access line when the same service provider operates the core network and the wireline network, the core network integrated with the wireline network. Furthermore, the method may include sending, by a service control point device, the instruction to the egress switch.

20 Claims, 8 Drawing Sheets

INTEGRATED WIRELESS AND WIRELINE NETWORKS

BACKGROUND INFORMATION

Typically, in a cellular network, a base transceiver station (BTS) serves as a wireless access point for cellular phones within an area (e.g., cells) that the BTS covers. A base station controller (BSC) controls the BTS and couples communication lines from the BTS to a mobile switching center (MSC). The MSC provides switching services for calls that are placed by wireless or landline devices in the area.

DETAILED DESCRIPTION OF PREFERRED EMBODIMENTS

The following detailed description refers to the accompanying drawings. The same reference numbers in different drawings may identify the same or similar elements. As used herein, the term "wireline" may refer to a traditional landline, such as a landline for telephones. The term "integrated networks," as used herein, may refer to networks that are directly interconnected, without another intervening network. For example, if networks X, Y, and Z are integrated, network X may directly communicate with Y without an intervening network between X and Y, and network Y may directly communicate with Z without an intervening network between Y and Z.

In the following description, a wireless network and a core network that are associated with or operated by a service provider may be integrated by adding a switch and service control point (e.g., installed) to the core network. The installed switch in the core network may be connected to a switch in the wireless network via a dedicated access line. Once connected, the installed switch may route calls from the wireless network toward devices in the wireline network in accordance with information provided by the service control point.

Figure 1A:
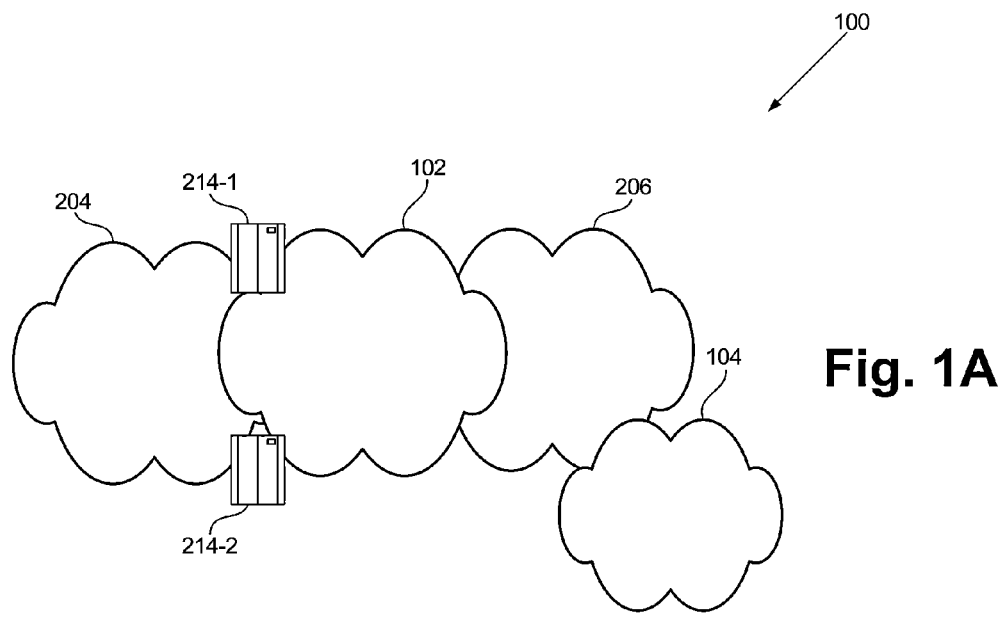
FIGS. 1A and 1B illustrate concepts described herein.
Figure 1B:
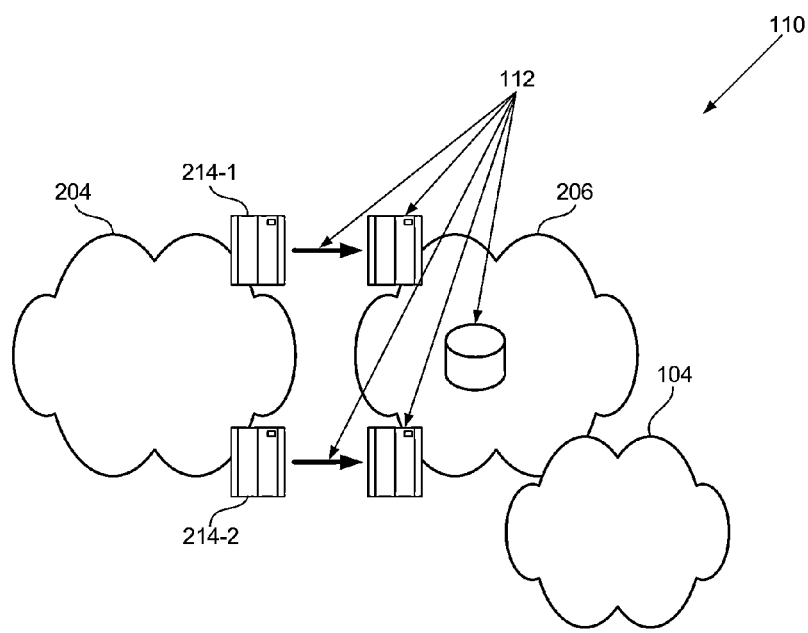

FIGS. 1A and 1B illustrate the concepts described herein. FIG. 1A is a diagram of a legacy network 100, in which networks that are associated with or operated by the same service provider are not integrated. As shown, legacy network 100 may include a public switched telephone network (PSTN) 102, wireless network 204, core network 206, switches 214-1 and 214-2, and wireline network 104. Wireless network 204 and core network 206 are associated with or operated by the same service provider. Switches 214-1 and 214-2 relay calls to and from wireless network 204 to PSTN 102 over core network 206. Assume that core network 206 and wireline network 104 are integrated.

In legacy network 100, because PSTN 102 intervenes between wireless network 204 and core network 206, a call which originates from wireless network 204 and is intended for a called party in wireline network 104 has to be routed through PSTN 102. Once the call is extended to core network 206, the call may be further routed to wireline network 104

FIG. 1B is a diagram of integrated network 110. As shown, integrated network 110 may include, in addition to the network elements illustrated in FIG. 1A, additional network elements 112. As further explained below, the additional elements can route a call that originates from wireless network 204 to another device in wireline network 104 without passing through PSTN 102.

In integrated network 110, the service provider may control the flow of calls from end-to-end, and, therefore, may not depend on another service provider in servicing customers. In addition, accordingly, the service provider may reduce a number of voice trunks/lines in wireline network 104 (e.g., eliminate a legacy line from the PSTN or a line from another service provider), thereby promoting the use of lower cost private networks.

Furthermore, while in integrated network 110, each of the calls may be subject to requirements and processes under a single service provider, rather than multiple service providers. This may enable faster call processing (e.g., fewer switching between different providers), enhanced billing accuracy (no need to track a call at disparate networks), lower rates (e.g., less switching cost), and more flexible services (e.g., fewer service provider constraints).

Figure 2:
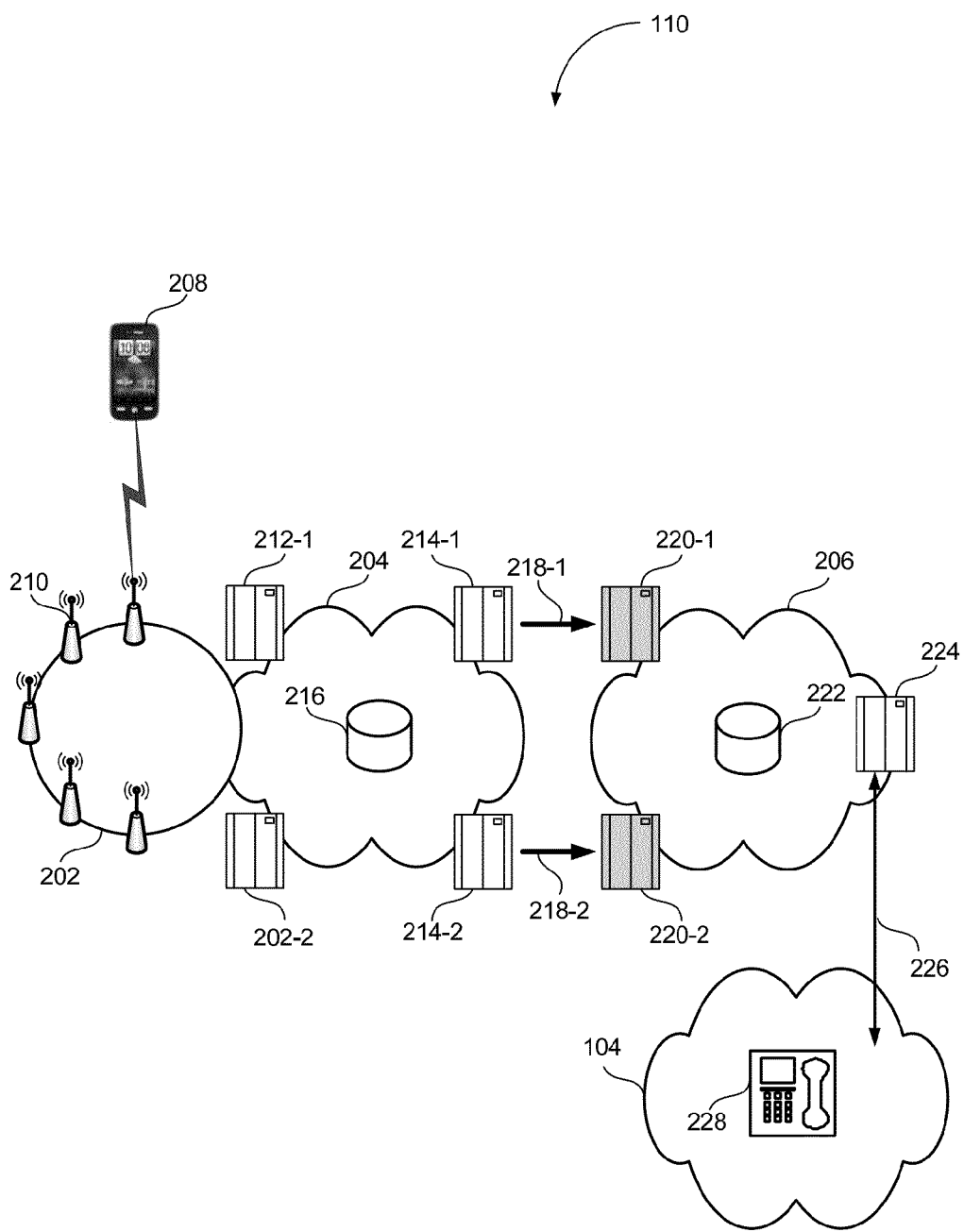
FIG. 2 shows an exemplary network in which the concepts described herein may be implemented.

FIG. 2 shows an exemplary integrated network 110 in which the concepts described herein may be implemented. As shown, integrated network 110 may include wireless network 202, wireless network 204, core network 206, wireline network 104, and a mobile device 208. In the following, it is assumed that a service provider that operates wireline network 104 also operates wireless network 204 and core network 206. The same service provider may or may not own/operate wireless network 202.

Wireless networks 202 and 204 may include a Global System for Mobile communications (GSM) network, Universal Mobile Telecommunications System (UMTS) network, Long Term Evolution (LTE) network, LTE-Advanced network, or another type of wireless network.

Core network 206 may include one or more telephone networks that are associated with or operated by the same service provider. The telephone networks may include a plain old telephone system (POTS), Intelligent Network (IN), Advanced Intelligent Networks (AIN), AIN 0.1, AIN 0.2, Capability Set 1 (CS1) network, CS2 network, Voice-over-Internet Protocol (VoIP) network, Voice-over-Frame Relay (VoFR), Voice-over-Asynchronous Transfer Mode (VoATM), etc. Core network 206 may route calls to/from devices terminating in different networks, and may be capable of servicing long distance calls.

Wireline network 104 may include landline telephones (e.g., private branch exchange (PBX) phones). Mobile device 208 may include a cellular phone (e.g., GSM phone, UMTS phone, etc.).

In FIG. 2, integrated network 110 is illustrated for simplicity and ease of understanding. Depending on the implementation, integrated network 110 may include additional, fewer, or different arrangement of network and network devices than those illustrated in FIG. 2.

Wireless networks 202 and 204, and core network 206 are described in greater detail below. Wireless network 202 may include one or more wireless access points (WAPs) 210 (e.g., base transceiver stations), base station controller (BSC) (not shown), 802.11X devices, etc.). WAP 210 may establish communication links with mobile device 208. The BSC may reserve radio frequencies, manage handoffs, convey calls to mobile switching centers and/or other functions associated with controlling base transceiver stations.

Wireless network 204 may include switches 212-1 and 212-2 (collectively "switches 212" and individually "switch 212"), service control point (SCP) 216, switches 214-1 and 214-2 (collectively "switches 214" and individually "switch 214"). Switch 212 may include a device (e.g., mobile switching center (MSC) switch/Mobile Telecommunications Switching Office (MTSO) switch, etc.) for routing calls that originate from wireless network 202. In routing a call, switch 212 may request SCP 216 to identify an egress MSC. Upon receiving a reply from SCP 216, switch 212 may route the call to a switch in wireless network 204 (e.g., an egress MSC switch, switch 214-1).

Switch 214 (e.g., a carrier class switch, such as a class 5 switch, class 4 switch, a server switch that implements a soft switch, etc.) may route a call from a switch (e.g., switch 212) in network 204 over a selected cable/fiber 218. In routing the call (e.g., by selecting cable/fiber 218), switch 214 may consult SCP 216.

SCP 216 may include a network element that processes requests for service handling, such as routing. In some implementations, SCP 216 may include a database system that may perform a lookup of information (e.g., routing information) based on a query from a device (e.g., a device in a service switching point (SSP), etc.) and send the information to the requesting device. The query may include, for example, information that may be used as a lookup key, such as a portion of a user profile.

Core network 206 may include cables/fibers 218-1 and 218-2 (collectively "cables/fibers 218" and individually "cable/fiber 218"), switches 220-1 and 220-2 (collectively "switches 220" and individually "switch 220"), a service control point (SCP) 222, an end office switch 224, and cable/fiber 226. Cable/fiber 218 may include a dedicated line (e.g., Signaling System 7 (SS7) line, Dedicated Access Line (DAL), etc.) to convey signals from switch 214 in wireless network 204 to switch 220 in core network 206.

Switch 220 (e.g., class 3 switch) may route calls to their respective switches in core network 206. In routing a call, switch 220 may query SCP 222 to identify the destination of the call. Based on the response, switch 220 may send the call to an identified switch in core network 206.

SCP 222 may operate in a similar manner as SCP 216. End office switch 224 may route a call from switch 220 to wireline network 104 via a cable/fiber 226. Wireline network 104 may convey the call to communication devices, such as telephone 228.

In FIG. 2, each of networks 202, 204, 206, and 104 may include additional, fewer, or different components devices than those illustrated in FIG. 2. For example, network 202 may include BSCs, MSCs, etc., network 204 may include multiple MSOs, carrier class switches (e.g., such as class 1 through 5 switches, a soft switch, etc.), SCPs, etc., and network 206 may include carrier class switches. Furthermore, in some implementations, a different device may perform one or more functions of a devices in network 110. For example, a call may be routed or directed from network 204 via device or a switch (not shown) that is tandem to switch 214.

Figure 3:
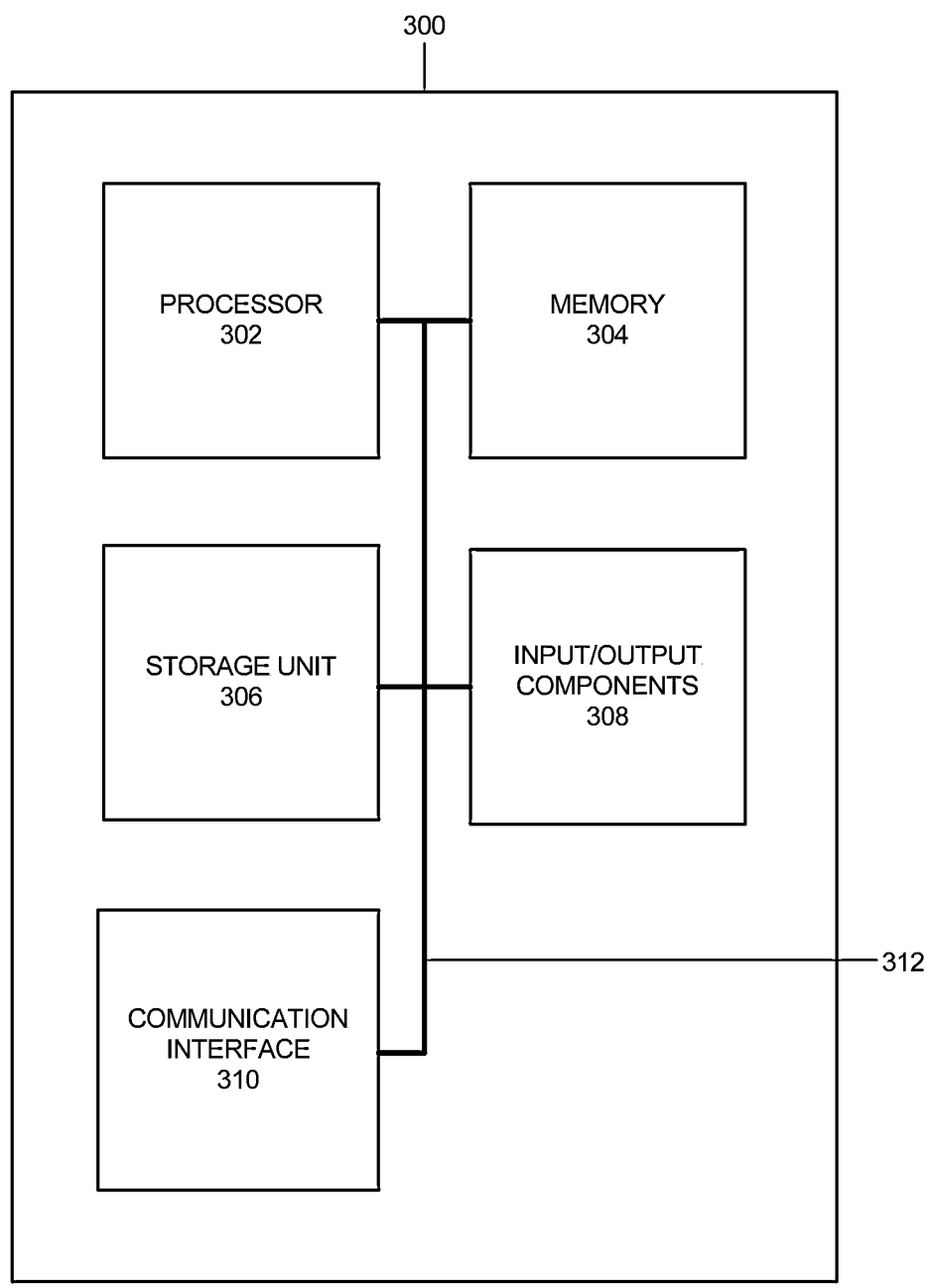
FIG. 3 is a block diagram of a network device of FIG. 2.

FIG. 3 is a block diagram of exemplary components of a network device 300. Network device 300 may represent SCP 216, 222, or a device at SCP 216 or 222. As shown, network device 300 may include a processor 302, memory 304, storage unit 306, input/output components 308, communication interface 310, and bus 312. Depending on the implementation, network device 300 may include additional, fewer, or different components. For example, network device 300 may include one or more power supplies, fans, motherboards, video cards, display screens, etc.

Processor 302 may include one or more processors, microprocessors, application specific integrated circuits (ASICs), field programmable gate arrays (FPGAs), or other processing logic that may interpret and execute instructions.

Memory 304 may include static memory, such as read only memory (ROM), and/or dynamic memory, such as random access memory (RAM), or onboard cache, for storing data and machine-readable instructions. Storage unit 306 may include a magnetic and/or optical storage/recording medium. In some implementations, storage unit 306 may be mounted under a directory tree or mapped to a drive.

Input/output components 308 may include a display, a keyboard, a mouse, a Digital Video Disk (DVD) writer, a DVD reader, Universal Serial Bus (USB) ports, and/or other types of components for converting physical events or phenomena to and/or from digital signals that pertain to network device 300.

Communication interface 310 may include any transceiver-like mechanism that enables network device 300 to communicate with other devices and/or systems. For example, communication interface 310 may include mechanisms for communicating via a network, such as a wireless network. Communication interface 310 may also include a modem or an Ethernet interface to a LAN or other network for communicating with other devices. Bus 312 may provide an interface through which components of network device 300 can communicate with one another.

Figure 4:
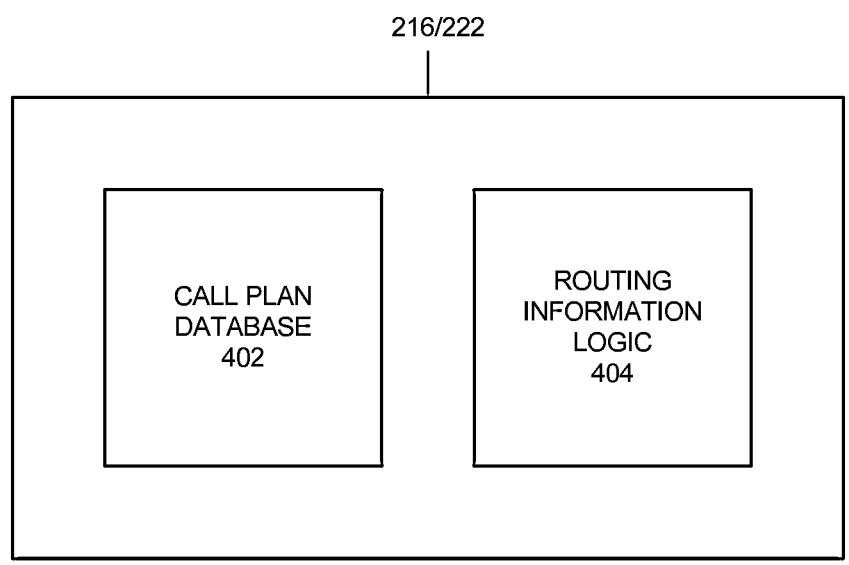
FIG. 4 is a block diagram of exemplary functional components of a service control point of FIG. 2.

FIG. 4 is a block diagram of exemplary functional components of SCP 216 or 222. As shown, SCP 216/222 may include a call plan database 402 and routing information logic 404. Depending on the implementation, SCP 216/222 may include additional, fewer, different, or different arrangement of components than those illustrated in FIG. 4. For example, SCP 216/222 may include an operating system, additional databases, etc.

Call plan database 402 may be stored in memory 304 and may include records of call plans that are associated with subscribers of a service provider that operates wireless network 204 and core network 206.

Routing information logic 404 may receive a request to identify one or more switches for routing a call based on a calling party profile. For example, routing information logic may retrieve a calling plan based on a number associated with the called party or calling party. In response to the request, routing information logic 404 may retrieve a description of the call plan from call plan database 402. In addition, based on the retrieved description, routing information logic may obtain routing information for the call.

For example, assume that switch 212-1 has requested routing information from SCP 216. In addition, assume that the calling party and the called party subscribe to services that are offered by a service provider that operates wireless network 204 and core network 206. In such an instance, SCP 216 may perform a lookup in call plan database 402 based on the telephone number of the called party. Upon determining that the called party is a subscriber to the service provider and that the call is directed to a wireline device in network 104, SCP 216 may instruct switch 212-1 to route the call to switch 214-1.

In another example, assume that switch 220-1 has requested routing information from SCP 222. In response, SCP 222 may instruct, based on the destination of the call, switch 220-1 to route the call to end office switch 224.

Figure 5:
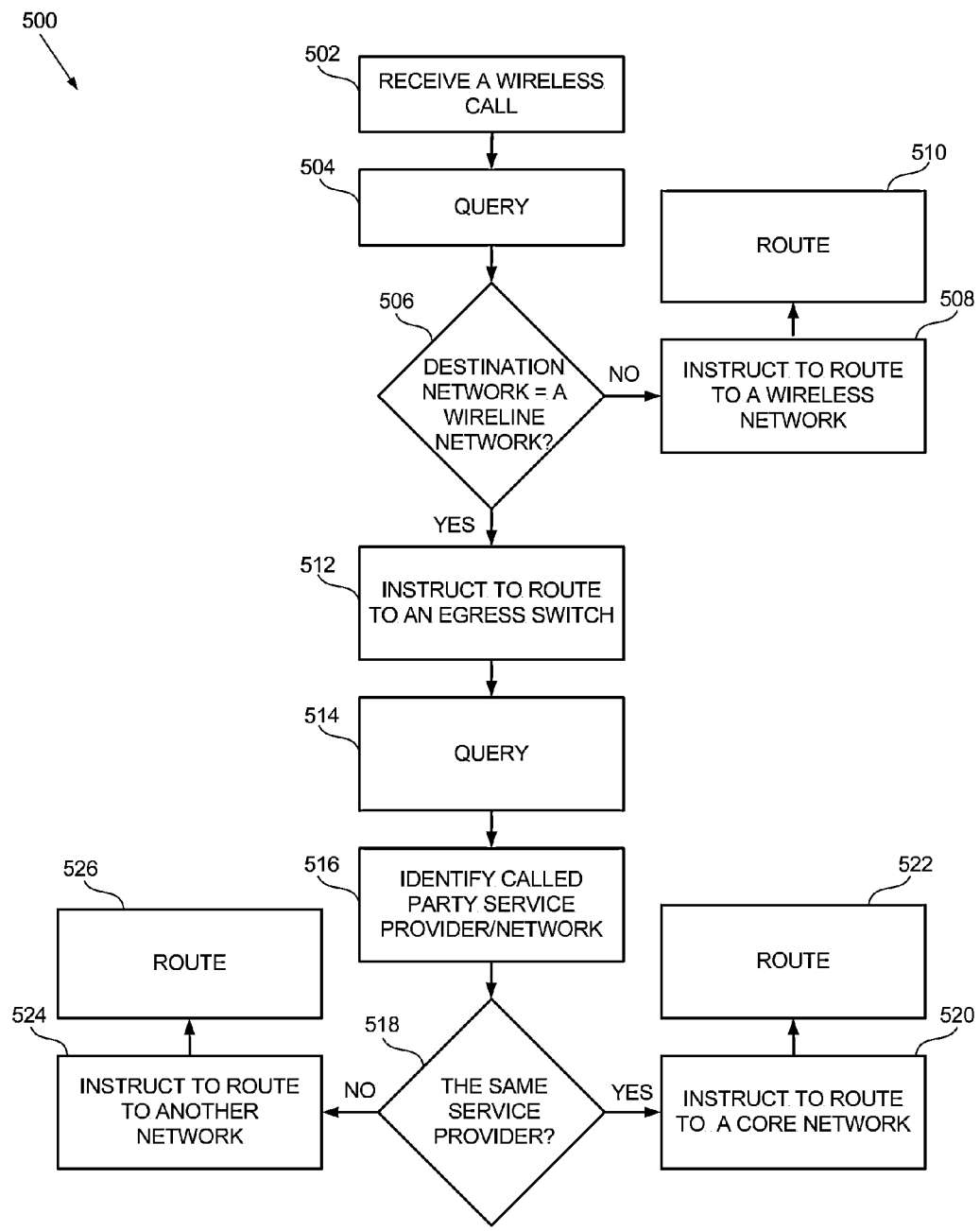
FIG. 5 is a flow diagram of an exemplary process for routing calls in the integrated network of FIG. 2.

FIG. 5 is a flow diagram of an exemplary process for routing calls in integrated network 110 of FIG. 2. Assume that mobile device 208 has placed a call originating in wireless network 202 to a party attached to core network 206 via a wireline. In addition, assume that the caller and the called party subscribe to services offered by a service provider associated with networks 204 and 206. Furthermore, in the following, assume that signaling information necessary to control call routing is exchanged between different devices. Process 500 may start with switch 212 receiving the wireless call (block 502).

Switch 212 may query SCP 216 (block 504) for routing information. In response, SCP 216 may determine the switch to which the call is to be routed. If a destination network (i.e., the network to which called party is attached) is not a wireline network (block 506—NO), SCP 216 may instruct switch 212 to route the call to wireless network 202 (block 508). Accordingly, switch 212 may route the call to wireless network 202 (block 510).

If the destination network is a wireline network (block 506—YES), SCP 216 may instruct switch 212 to route the call to egress switch 214 (block 512). When the call is extended to egress switch 214, switch 214 may query SCP 216 for additional routing information (block 514).

SCP 216 may identify a service provider to which the called party is subscribed (block 516), or alternatively, identify a network to which the called party is attached (block 516). If SCP 216 determines that the destination network is associated with/operated by the same service provider as wireless network 202 or 204 (block 518—YES), SCP 216 may instruct switch 214 to route the call to core network 206 (block 520). Accordingly switch 214 may route the call to switch 220 on core network 206 via, for example, DAL 218 (block 522).

If SCP 216 determines that the destination network is not associated with/operated by the same service provider (block 518—NO), SCP 216 may instruct switch 214 to route the call to a network other than core network 206. Switch 214 may route the call accordingly.

Once the call is routed to core network 206, switches in core network 206 may route the call to its wireline devices attached to core network 206 (e.g., via other networks, such as network 104) based on information provided by SCP 222. In this manner, calls may avoid being routed over PSTN 102 (FIG. 1).

Figure 6:
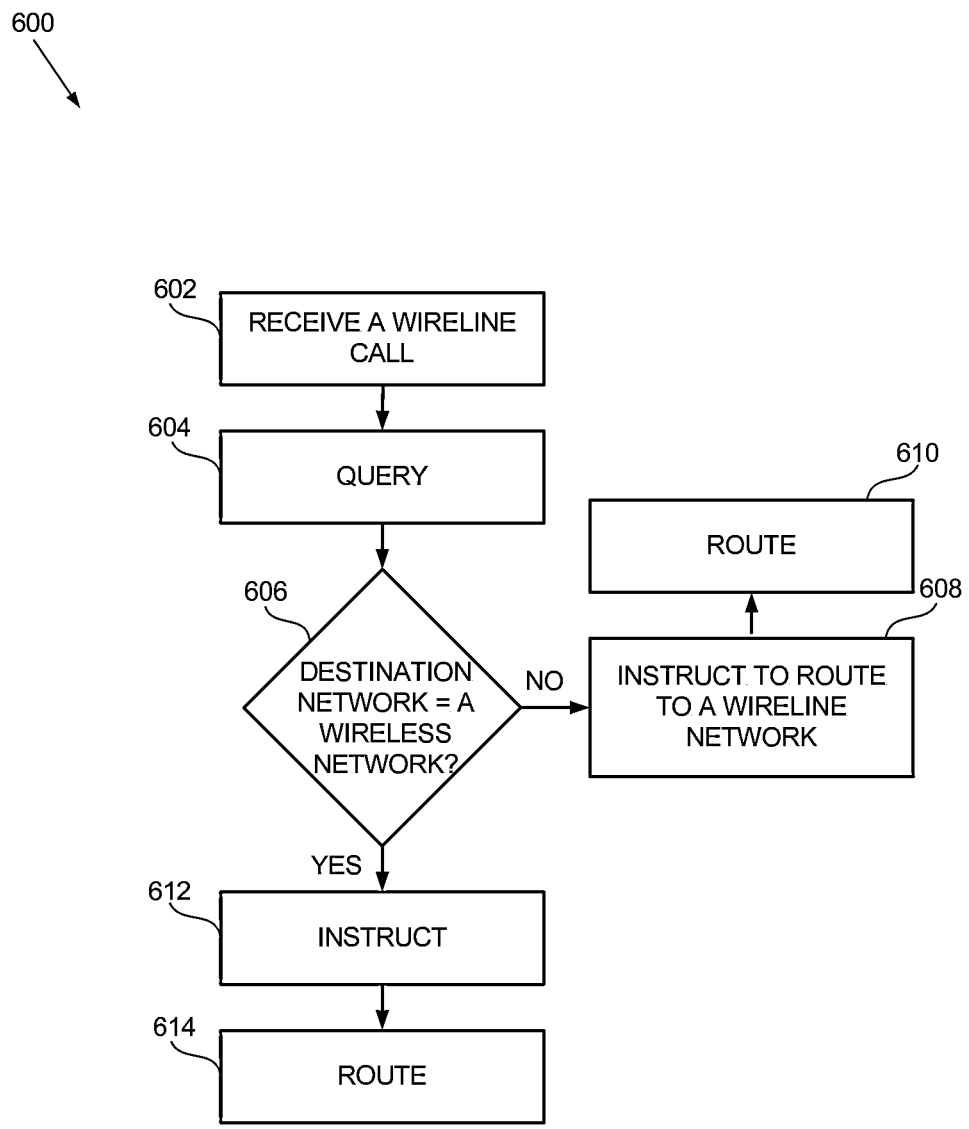
FIG. 6 is a flow diagram of another exemplary process for routing calls in the integrated network of FIG. 2.
Figure 7:
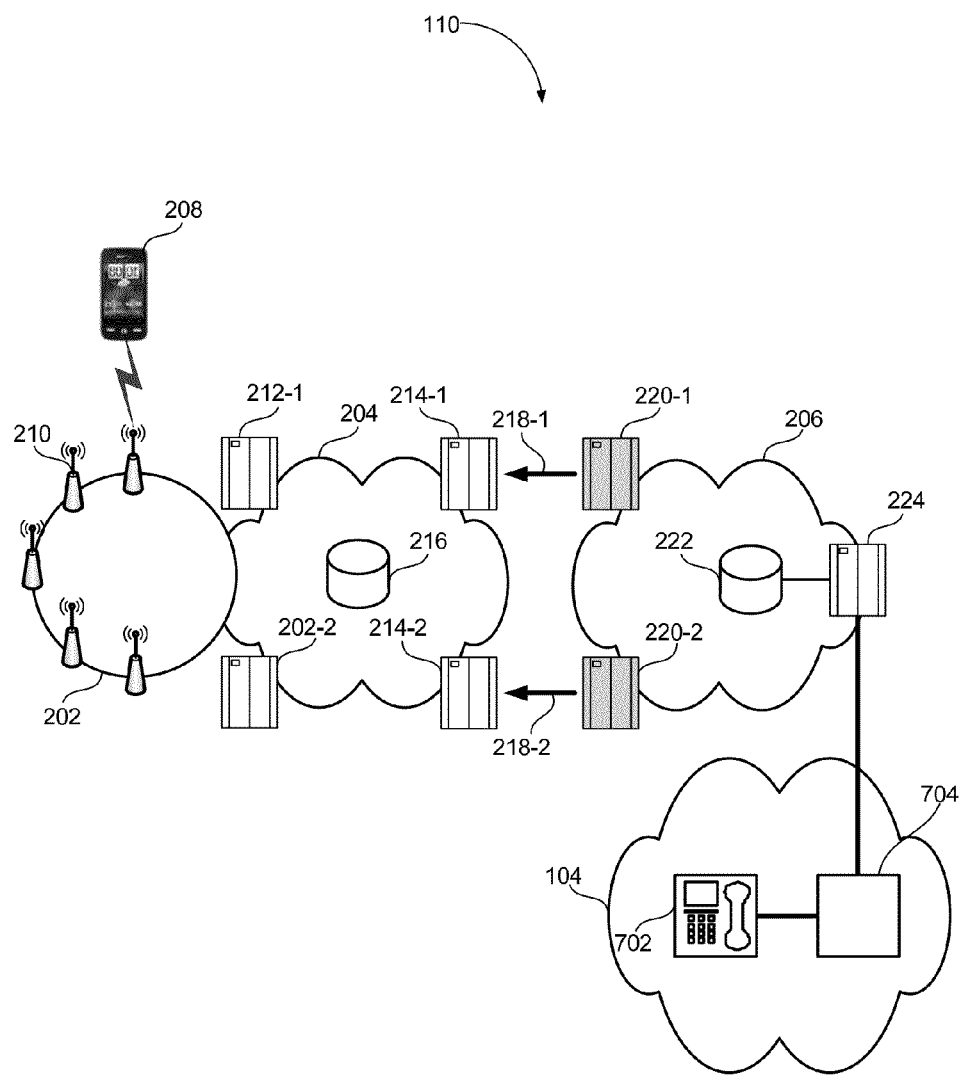
FIG. 7 shows the network of FIG. 2 when a call is initiated from an exemplary wireline device.

FIG. 6 a flow diagram of another exemplary process 600 for routing calls in integrated network 110. In process 600, integrated network 110 may route a call that is initiated from within a wireline network, as illustrated in FIG. 7. Assume that a caller at a wireline device 702 has placed a call to mobile device 208. Assume that wireless network 204 and core network 206 are associated with (e.g., owned by) or are operated by the same service provider, and that the caller and the called party are subscribers to the same service provider.

Process 600 may start with switch 224 receiving the wireline call from wireline device 702 via, for example, a private branch exchange 704 (block 602). Alternatively, the call may be received via a POTS device or another device. When the call arrives at switch 224, switch 224 may query SCP 222 (block 604) for routing information. In response, SCP 222 may determine the switch to which the call is to be routed. For example, SCP 222 may use a portion or all of the digits of the number of the calling party and a called cell phone number to determine that the call is to be routed via switch 220.

If the destination network is not wireless network 202 (block 606—NO), SCP 222 may instruct switch 224 to route the call to another wireline network via a switch in core network 206 (block 608). The switch in core network 206 may direct the call accordingly (block 610). If the destination network is wireless network 202 (block 606—YES), SCP 222 may instruct switch 224 to route the call to switch 220, which may then route the call to a switch in wireless network 204 (block 612). Thereafter, wireless network 204 may route the call toward mobile device 208 in accordance with the cell phone number (block 614).

In the above description, a wireless network 204 associated with a service provider may have been integrated with core network 206 that is associated with or operated by the same service provider. In integrating wireless and core networks 204 and 206, switches 220, service control point 222, and lines, such as DAL 218, may be installed in core network 206 and wireless network 204. Furthermore, switch 220 may be connected to switch 214 in network 204 via the DAL 218. Once connected, switch 214 may route calls to their destinations in accordance with information provided by SCP 216.

In integrated network 110, the service provider may control the flow of calls from end-to-end, and, therefore, may not depend on another service provider in servicing customers. In addition, accordingly, the service provider may reduce a number of voice trunks at a customer site in wireline network 104, promoting the use of low cost private networks.

Furthermore, while in integrated network 110, each of the calls may be subject to requirements and processes under a single service provider, rather than multiple service providers. This may enable faster call processing (e.g., fewer switching between different providers), enhanced billing accuracy (e.g., no need to track a call at disparate networks), lower rates (e.g., less switching cost), and more flexible services (e.g., fewer service provider constraints).

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Figure 8:
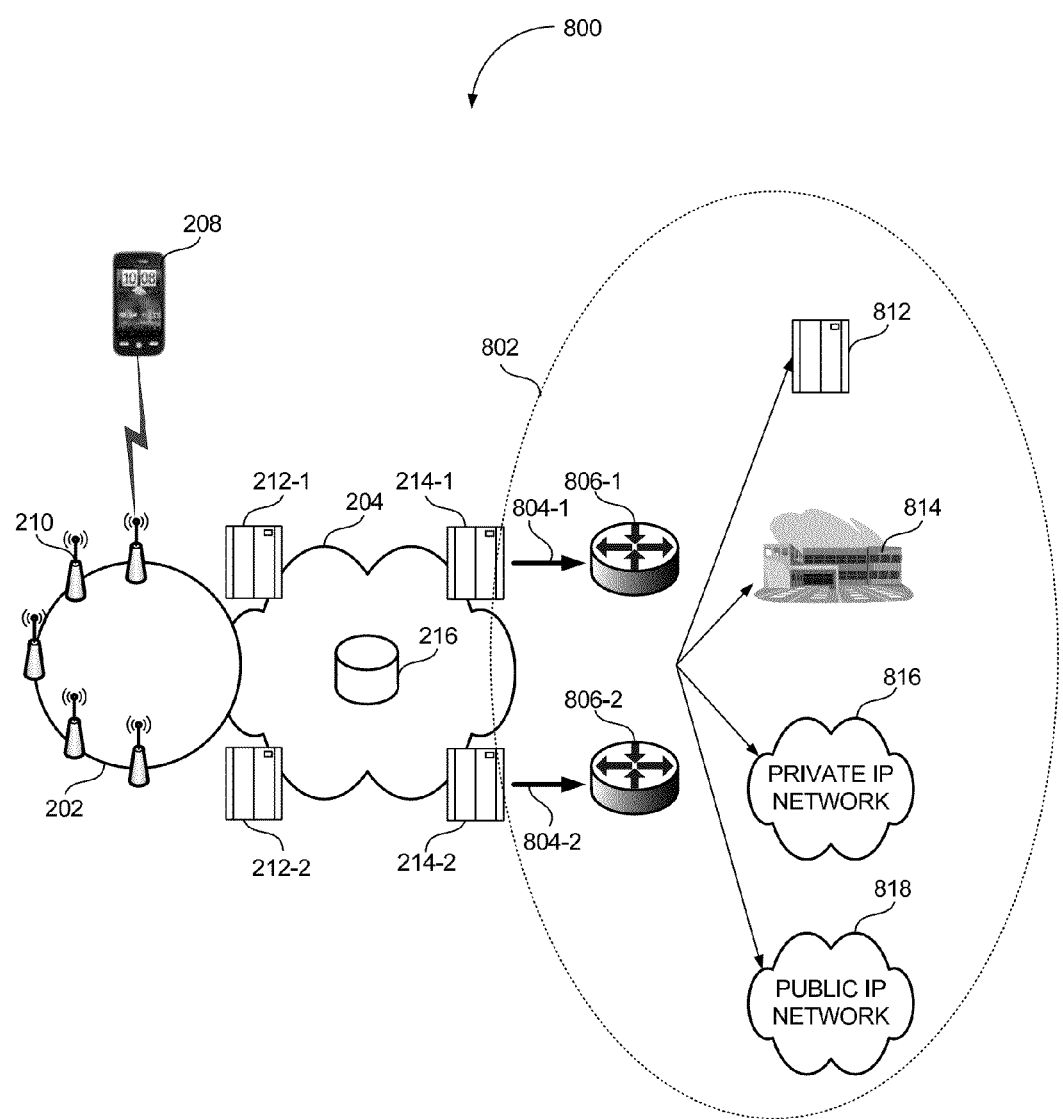
FIG. 8 shows another exemplary network in which the concepts described herein may be implemented.

For example, FIG. 8 shows another exemplary network 800 in which the concepts described herein may be implemented. As shown, network 800 may include mobile device 208, wireless network 202, wireless network 204, and network 802. In FIG. 8, wireless network 202, wireless network 204, and mobile device 208 may operate in a similar manner as described above for FIGS. 2 and 7.

Network 802 may include trunk groups (TGs) 804-1 and 804-2, media gateway (MG)/session border controllers (SBC) 806-1 and 806-2 (collectively "MG/SBCs 806" and individually "MG/SBC 806"), an Internet Protocol (IP)/Time Division Multiplexed (TDM) network 812, a long distance (LD) TDM network 814, a private IP network 816, and a public IP network 818. Depending on the implementation, network 802 may include additional, fewer, or different networks than those illustrated in FIG. 8. For example, network 802 may include a fiber-optics network (e.g., passive optical networks (PONS)), an ad hoc network, a local area network (LAN), a wide area network (WAN), a wireless LAN, a metropolitan area network (MAN), a satellite-based network, any other network, or a combination of networks.

TG 804 may interconnect switch 214 and MG/SBC 806. TG 804 may convey signals from/to switch 212 to/from MG/SBC 806. MG/SBC 806 may translate at least some of analog signals (e.g., telephone signals from switch 212)

to/from digital data (e.g., packets) (e.g., packets from/to networks 812, 816, and 818, etc.).

IP/TDM network 812 may include a network of Voice-over-IP (VoIP) devices, TDM devices, and/or integrated IP/TDM devices. LD TDM network 814 may include interconnected long-distance TDM network components. Private IP network 816 may include intranet, home IP networks, personal area networks, corporate networks, etc. Public IP network 818 may include, for example, the Internet. In some implementations, private IP network 816 and public IP network 818 may include Multiprotocol Label Switched (MPLS) networks.

In operation, integrated network 800 may operate in a similar fashion as integrated network 110. Combinations of analog/digital calls/signals may traverse network 802 in place of or in addition to network 206. Calls in integrated network 800 may be routed in a manner similar to those in integrated network 110.

In addition to network 802, other implementations and variations are possible in light of the above teachings. For example, while series of acts/blocks have been described with respect to FIGS. 5 and 6, the order of acts/blocks may be varied in other implementations. Moreover, non-dependent acts/blocks may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, from an egress switch in a first wireless network, a request for instructions for routing a call from a calling party to a called party in a wireline network;
performing a lookup to identify a service provider associated with a profile of the called party in a database;
generating, when the identified service provider is a same service provider associated with the first wireless network, a first instruction indicating that the egress switch is to route the call to a core network connected to the egress switch via a direct access line, wherein the core network is integrated with the wireline network;
generating, when the identified service provider is not the same service provider, a second instruction indicating that the egress switch is to route the call to the wireline network via a network other than the core network; and
sending, by a service control point device, the first instruction or the second instruction to the egress switch.

2. The method of claim 1, further comprising:
receiving, from an ingress switch in the first wireless network, the call at the egress switch based on routing information obtained from the service control point device indicating that the called party is in the wireline network; and
routing the call to the core network in accordance with the first instruction via the direct access line or a device tandem to the egress switch.

3. The method of claim 2, further comprising:
routing the call, from within the core network, to the called party in the wireline network.

4. The method of claim 3, wherein the routing call, from within the core network, includes routing the call to:
a long distance (LD) time division multiplexed (TDM) network or an Internet-Protocol (IP)/TDM network.

5. The method of claim 1, wherein the performing the lookup comprises looking up a call plan for the called party in a call plan database in the service control point device.

6. The method of claim 1, further comprising:
receiving a second call from a device in the wireline network; and
routing the second call to the first wireless network without accessing a public switched telephone network.

7. The method of claim 1, further comprising:
receiving, at the egress switch, the call routed from a mobile switching center in the first wireless network.

8. The method of claim 1, further comprising:
instructing switches in the core network to route a call that originates from the wireline network and is destined for a mobile device in a second wireless network,
wherein the second wireless network is integrated with the first wireless network.

9. The method of claim 1, further comprising:
receiving, at an ingress switch of the first wireless network, the call from a mobile device in a second wireless network integrated with the first wireless network;
obtaining routing information from the service control point device indicating that the called party is in the wireline network; and
sending the call from the ingress switch to the egress switch.

10. A system comprising:
a first wireless network configured to:
route a call received from a mobile device, the call being associated with a calling party and a called party in a wireline network that is integrated with a core network;
a second wireless network operated by a first service provider, the second wireless network configured to:
receive the call from the first wireless network, wherein the wireline network is operated by a second service provider,
generate, when first service provider and the second service provider are a same service provider, a first instruction indicating that a switch in the second wireless network is to route the call to the core network, wherein the core network is integrated with the second wireless network,
generate, when the first service provider and the second service provider are not the same service provider, a second instruction indicating that the switch is to route the call to the wireline network via a network outside the system; and route the call to the core network in accordance with the first instruction or to the network outside the system in accordance with the second instruction; and the core network operated by the same service provider, the core network configured to:

receive the routed call from the switch in the second wireless network, and route the call to the wireline network.

11. The system of claim 10, further comprising:

the wireline network configured to:

receive the call from the core network, and convey the call to the called party.

12. The system of claim 10, wherein the called party includes:

a device in a private branch exchange (PBX) system.

13. The system of claim 10, wherein the second wireless network includes a service control point device that generates the first instruction and the second instruction.

14. A device comprising:

a memory including a database; and a processor configured to:

receive, at an ingress switch in a first wireless network, a call from a calling party to a called party, determine, based on first routing information obtained from the database, that the called party is associated with a wireline network, instruct, based on the determination that the called party is associated with a wireline network, the ingress switch to route the call within the first wireless network to an egress switch, identify, based on second routing information obtained from the database, a service provider for the called party in the database, generate, when the identified service provider is a same service provider associated with the first wireless network, a first instruction indicating that the egress switch is to route the call to a core network connected to the switch via a direct access line, generate, when the identified service provider is not the same service provider, a second instruction indicating that the egress switch is to route the call to the wireline network via a network other than the core network; and send the first instruction or the second instruction to the egress switch, wherein the core network is integrated with the wireline network.

15. The device of claim 14, comprising:

a service control point (SCP) device.

16. The device of claim 14, wherein the egress switch includes a carrier class switch.

17. The device of claim 14, wherein the core network includes a second switch to which the direct access line is connected.

18. The device of claim 17, wherein the second switch includes at least one of:

a media gateway, session border controller, or carrier class switch.

19. The device of claim 17, wherein the wireline network includes at least one of:

a private Internet Protocol (IP) network, a long distance (LD) time division multiplexed (TDM) network, or an IP/TDM network.

20. The device of claim 17, wherein the direct access line include a trunk group.

* * * * *